United States Patent [19]
Ueda

[11] Patent Number: 5,383,059
[45] Date of Patent: Jan. 17, 1995

[54] NONVARIABLE TRANSVERSE MAGNIFICATION FOCUSSING METHOD AND LENS SYSTEMS

[75] Inventor: Toshihiko Ueda, Toyokawa, Japan

[73] Assignee: Minolta Co., Ltd., Osaka, Japan

[21] Appl. No.: 73,716

[22] Filed: Jun. 8, 1993

[30] Foreign Application Priority Data

Jun. 11, 1992 [JP] Japan .................. 4-175957

[51] Int. Cl.$^6$ .................................................. G02B 9/64
[52] U.S. Cl. ....................................... 359/754; 359/755
[58] Field of Search ............... 359/793, 691, 692, 679, 359/754, 755, 663

[56] References Cited

U.S. PATENT DOCUMENTS 4,929,066 5/1990 Wakimoto et al. ............... 359/754

Primary Examiner—Scott J. Sugarman
Attorney, Agent, or Firm—Price, Gess & Ubell

[57] ABSTRACT

An nonvariable transverse magnification focussing method and lens system for maintaining a transverse magnification at a fixed value even when the movement distance of each lens group is quite small by moving the basis of the first lens group and the second lens group while maintaining the relationship therebetween with a suitable paraxial arrangement in accordance with specific principles.

4 Claims, 4 Drawing Sheets

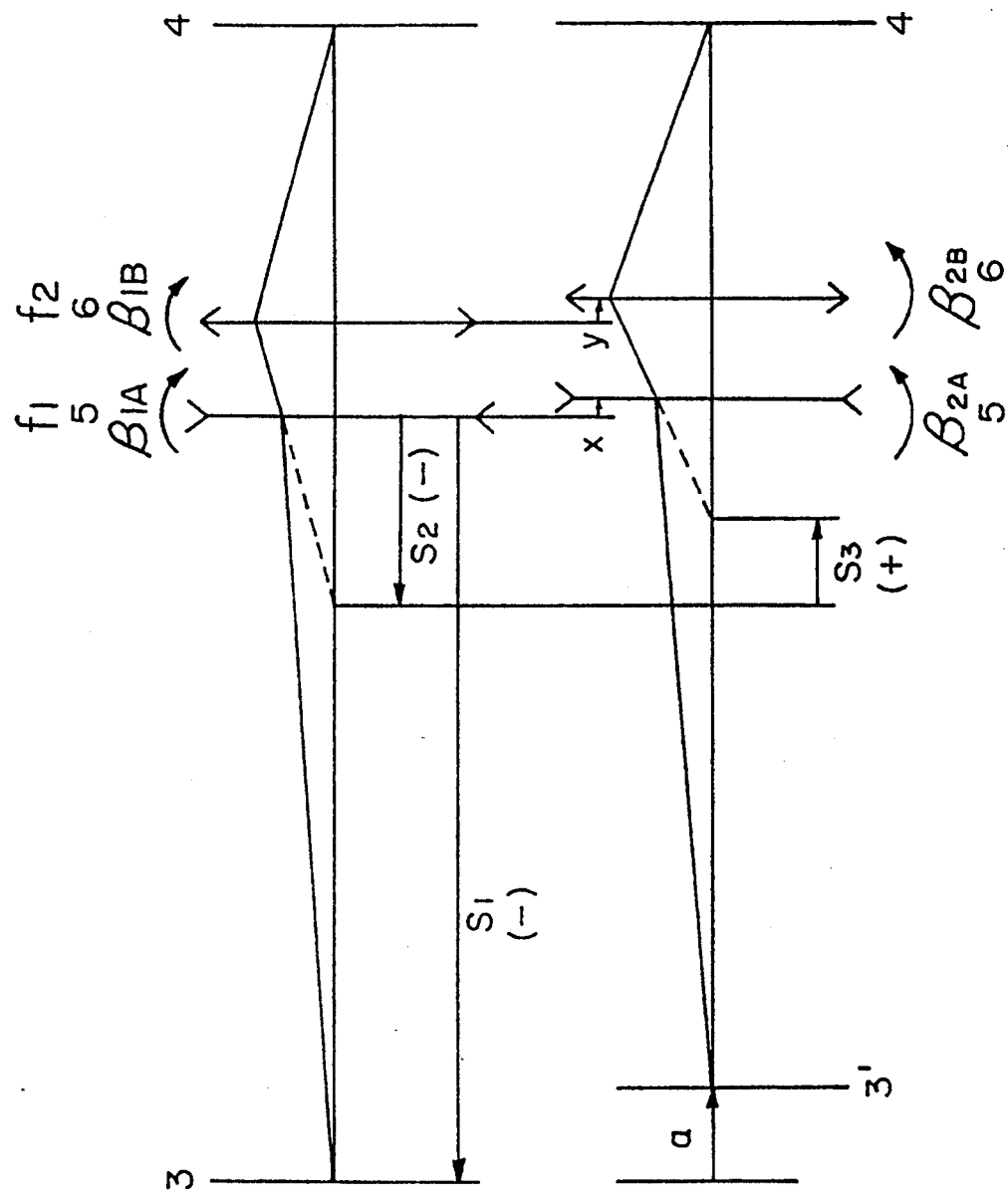

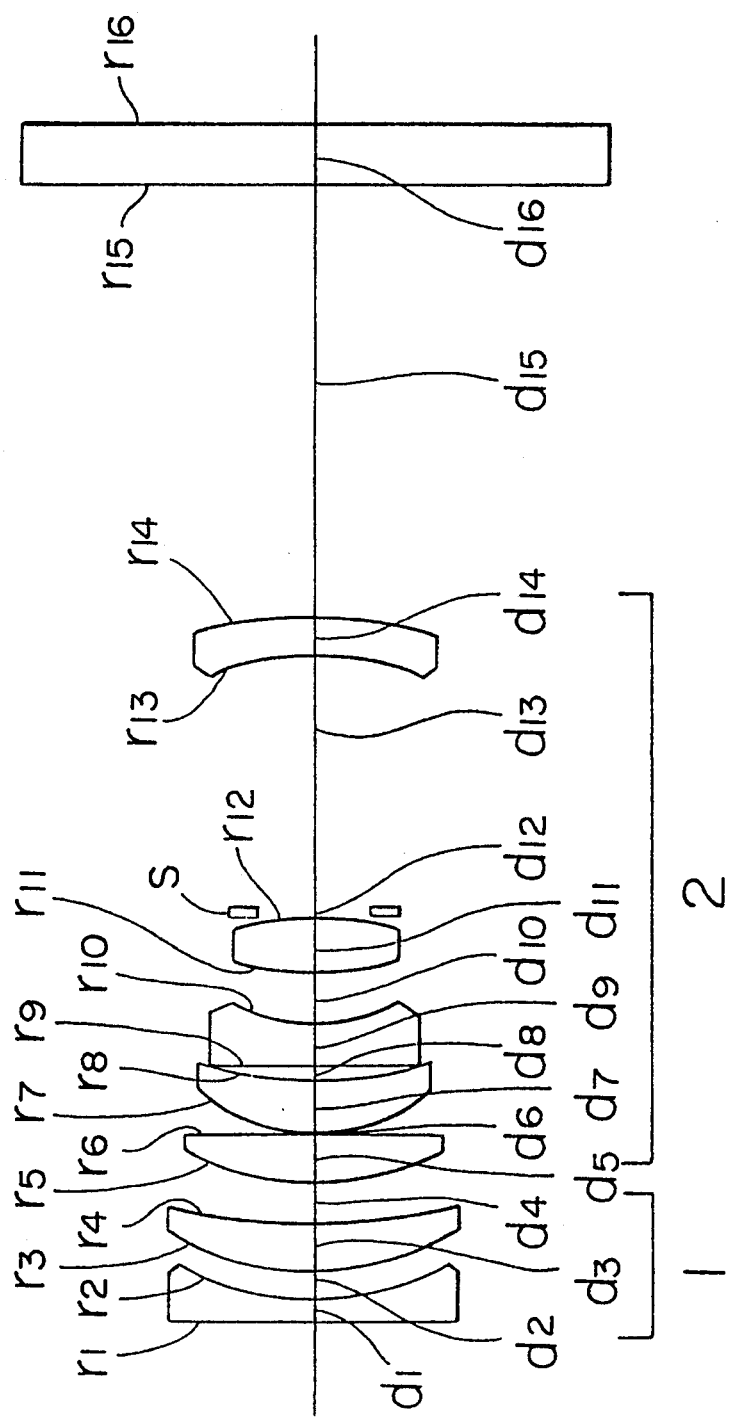

NONVARIABLE TRANSVERSE MAGNIFICATION FOCUSSING METHOD AND LENS SYSTEMS

BACKGROUND OF THE INVENTION

1. Field of the Invention

The present invention relates to a focusing method and lens system for maintaining a constant transverse magnification in a lens system comprising a front lens group and a rear lens group by moving said anterior lens group and posterior lens group in accordance with changes in the object plane (position of the object).

2. Description of the Related Art

As shown in FIG. 2A, a lens system comprising a first lens group 1 having a focal length equivalent to an object distance $f_1$, and a second lens group 2 having a focal length $f_2$ is considered. The object image on object point 3 is formed at image point 4.

As shown in FIG. 2B, when, for example, the object point 3 is moved a distance [a] only to the lens side, an a focal construction is formed between the first lens group 1 and the second lens group 2. If the first lens group 1 is moved a distance [a] only to the image side, the transverse magnification $\beta(\beta = -f_2/f_1)$ is nonvariable. That is, in the present instance, the moving distance of the first lens group 1 is large, and disadvantageously, the diameter of the moving group also becomes larger.

SUMMARY OF THE INVENTION

The inventors of the present invention have discovered that the transverse magnification can be rendered nonvariable even when the movement distance of each lens group is quite small by moving the basis of the first lens group 1 and the second lens group 2 while maintaining the relationship therebetween with a suitable paraxial arrangement in accordance with specific principles.

A main object of the present invention is to provide a focussing method that eliminates the disadvantages associated with conventional methods.

A further object of the present invention is to provide a focussing method which maintains a constant transverse magnification when the first lens group and the second lens group are moved.

A still further object of the present invention is to provide a compact lens system capable of focussing while maintaining a constant transverse magnification.

These and other objects are attained by a focussing method in a lens system comprising a first lens group and a second lens group each having limited focal lengths, wherein the first lens group and the second lens group are movable independently while maintaining a specific relation in accordance with the movement of the object point and without a change of transverse magnification.

BRIEF DESCRIPTION OF THE DRAWINGS

These and other objects or features of the present invention will become apparent from the following description of a preferred embodiment thereof taken in conjunction with the accompanying drawings, in which:

FIGS. 1A and 1B are paraxial optical path diagrams showing lens construction and thin lens power of the present invention;

FIG. 3 is a section view showing details of the lens construction of the present invention.

In the following description, like parts are designated by like reference numbers throughout the several drawings.

DESCRIPTION OF THE PREFERRED EMBODIMENT

Figures 2A, 2B:
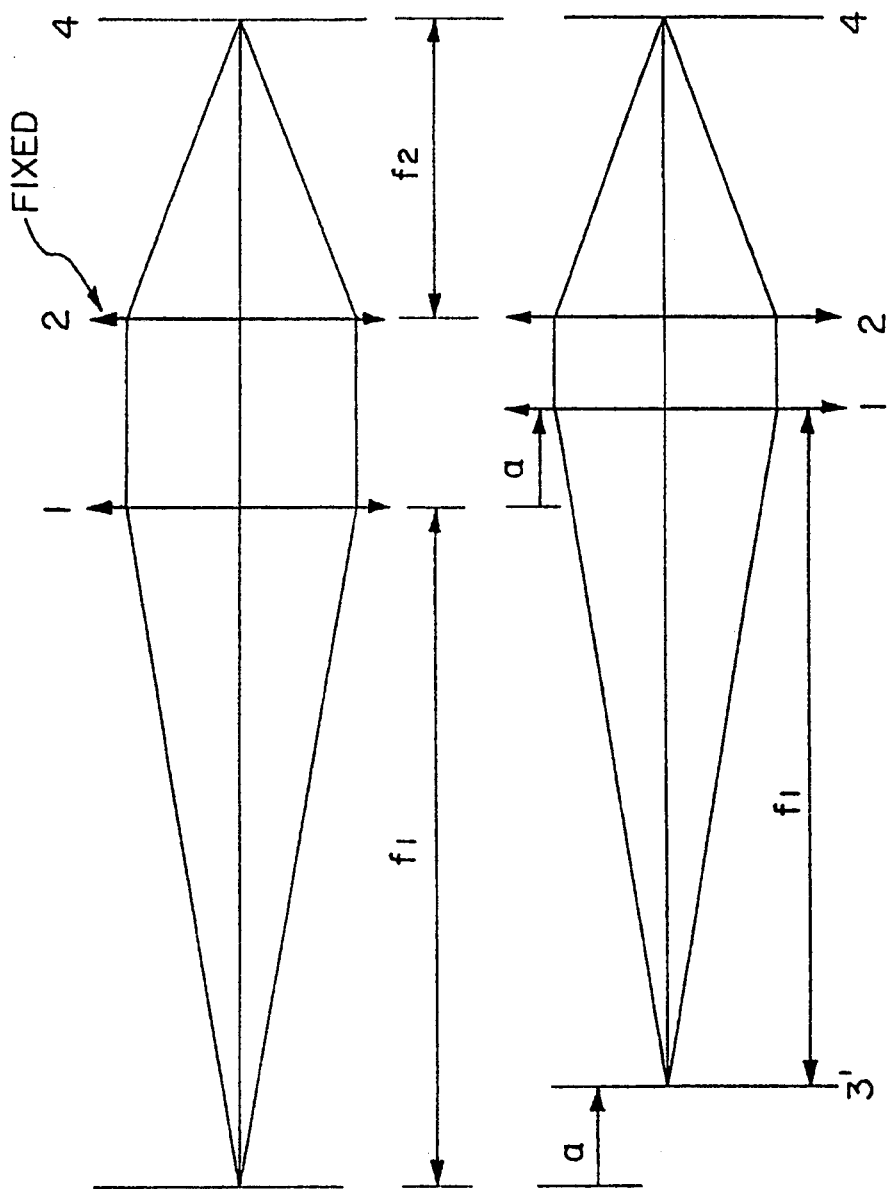
FIGS. 2A and 2B are paraxial optical path diagrams showing conventional lens construction and thin lens power.

The preferred embodiments of the present invention are described hereinafter with reference to the accompanying drawings. FIGS. 1A and 1B are paraxial optical path diagrams. The image forming lens system is divided into two groups, a first lens group 5 having a focal length $f_1$ and a second lens group 6 having a focal length $f_2$. The first and seconds lens groups 5 and 6, while maintaining a specific relation therebetween, are independently movable in the direction of an optical axis so as to maintain a constant transverse magnification relative to a position change [a] of the position of an object point 3 to an object point 3' (the coordinate system is such that the left side is always positive).

When the amount of movement of the object point 3 is designated [a] (upon the movement to an image side of object point 3: $a > 0$, upon the movement to an object side of object point 3: $a < 0$), the focal length of the first lens group 5 is designated $f_1$, the focal length of the second lens group 6 is designated $f_2$, the transverse magnification around the first lens group 5 is designated $\beta 1A$ in the state $(a=0)$ described in FIG. 1A, the transverse magnification around the second lens group 6 is designated $\beta 1B$ in the state $(a=0)$ described in FIG. 1A, the transverse magnification around the first lens group 5 is designated $\beta 2A$ in the state $(a=a)$ described in FIG. 1B, the transverse magnification around the second lens group 6 is designated $\beta 2B$ in the state $(a=a)$ described in FIG. 1B, the amount of movement of the first lens group 5 when changing from the FIG. 1A state to the FIG. 1B state (right side is positive) is designated [x], the amount of movement of the second lens group 6 when changing from the FIG. 1A state to the FIG. 1B state (right side is positive) is designated [y], the distance from the first lens group 5 to the object point 3 in the state described in FIG. 1A (with the first lens group as the origin point, the right side is positive) is designated $S_1$, the distance from the first lens group 5 to the object point 4 in the state described in FIG. 1A (with the first lens group as the origin point, the right side is positive) is designated $S_2$, the amount of movement of the image point of the first lens group 5 when changing from the FIG. 1A state to the FIG. 1B state (when the FIG. 1A state is the origin, the right side is positive) is designated $S_3$, the transverse magnification in the states described in FIGS. 1A and 1B is nonvariable, such that the following equations may be obtained.

$$\beta 1A \cdot \beta 1B = \beta 2a \cdot \beta 2B \tag{1}$$

From the paraxial relation around the first lens group 5, the following equations 2 through 5 may be derived.

From the state described in FIG. 1A we obtain the following equations.

$$S_1 = -f_1\left(1 - \frac{1}{\beta 1A}\right) \quad (2)$$

$$S_2 = f_1(1 - \beta 1A) \quad (3)$$

From the state described in FIG. 1B we obtain the following equations.

$$S_1 + a - x = -f_1\left(1 - \frac{1}{\beta 2A}\right) \quad (4)$$

$$S_2 + S_3 - x = f_1(1 - \beta 2A) \quad (5)$$

From the paraxial relation around the second lens group 6, the following equations 6 and 7 may be derived.

$$S_3 = f_2\left(\beta 2B + \frac{1}{\beta 2B} - \beta 1B - \frac{1}{\beta 1B}\right) \quad (6)$$

$$y = f_2(\beta 2B - \beta 1B) \quad (7)$$

From the aforesaid Eqs. 2, 3, 4, and 5 we can eliminate the factors $S_1$ and $S_2$, and by solving for the factors of [x] and $S_3$ we can derive Eqs. 8 and 9.

$$x = a - f_1\left(\frac{1}{\beta 2A} - \frac{1}{\beta 1A}\right) \quad (8)$$

$$S_3 = a - f_1\left(\beta 2A + \frac{1}{\beta 2A} - \beta 1A - \frac{1}{\beta 1A}\right) \quad (9)$$

From the aforesaid Eqs. 6 and 9, we can eliminate the factor $S_3$, and can derive the following Eq. 10.

When we eliminate the factor $\beta 2B$ from the aforesaid Eqs. 1 and 10, we can adjust the factor $$f_2\left(\beta 2B + \frac{1}{\beta 2B} - \beta 1B - \frac{1}{\beta 1B}\right) = \quad (10)$$

$$a - f_1\left(\beta 2A + \frac{1}{\beta 2A} - \beta 1A - \frac{1}{\beta 1A}\right)$$

$\beta 2A$ and thereby derive Eq. 11.

$$A\beta 2A^2 + B\beta 2A + C = 0 \quad (11)$$

where the factors A, B and C express the following:

$$A = f_1 + \frac{f_2}{\beta 1A \beta 1B}$$

$$B = -\left\{f_1\left(\beta 1A + \frac{1}{\beta 1A}\right) + f_2\left(\beta 1B + \frac{1}{\beta 1B}\right) + a\right\} \quad (12)$$

$$C = f_1 + f_2\beta 1A\beta 1B$$

Accordingly, when $f_1 < 0$ the factor $\beta 2A > 0$ can be solved and when $f_1 > 0$ the factor $\beta 2A < 0$ can be solved to derive the following equation.

$$\beta 2A = \frac{-B \pm \sqrt{B^2 - 4AC}}{2A} \quad (13)$$

and $$\beta 2B = \frac{\beta 1A\beta 1B}{\beta 2A}$$

Although, in the aforesaid example the first lens group 5 is a negative lens group, and the second lens group 6 is a positive lens group, it should be clear to those skilled in the art that, alternatively, said first lens group 5 may be a positive lens group and said second lens group 6 may be a negative lens group.

Concrete examples of a lens system adapted for the nonvariable transverse magnification focussing method is described below in Table 1.

TABLE 1

| | Radius of Curvature | | Spacing on Axis | | Refractive Index (Na) | | Abbe No. (νd) |
|---|---|---|---|---|---|---|---|
| | | | Lens Group 1 | | | | |
| r1 | −178.168 | | | | | | |
| | | d1 | 1.000 | N1 | 1.78831 | ν1 | 47.32 |
| r2 | 15.006 | | | | | | |
| | | d2 | 1.600 | | | | |
| r3 | 16.244 | | | | | | |
| | | d3 | 2.700 | N2 | 1.68300 | ν2 | 31.52 |
| r4 | 50.962 | | | | | | |
| | | d4 | 2.050~2.691 | | | | |
| r5 | 18.260 | | | | | | |
| | | d5 | 2.200 | N3 | 1.67003 | ν3 | 47.15 |
| | | | Lens Group 2 | | | | |
| r6 | 288.268 | | | | | | |
| | | d6 | 0.400 | | | | |
| r7 | 10.960 | | | | | | |
| | | d7 | 2.500 | N4 | 1.72000 | ν4 | 52.14 |
| r8 | 23.753 | | | | | | |
| | | d8 | 0.550 | | | | |
| r9 | 701.399 | | | | | | |
| | | d9 | 2.200 | N5 | 1.80518 | ν5 | 25.43 |
| r10 | 9.248 | | | | | | |
| | | d10 | 2.500 | | | | |
| r11 | 18.960 | | | | | | |
| | | d11 | 2.800 | N6 | 1.56567 | ν6 | 43.02 |
| r12 | −23.961 | | | | | | |
| | | d12 | 0.0 | | | | |
| | | | S DIAPHRAGM | | | | |
| | | d13 | 13.500 | | | | |
| r13 | −13.376 | | | | | | |
| | | d14 | 1.700 | N7 | 1.49310 | ν7 | 83.58 |
| r14 | −24.209 | | | | | | |
| | | d15 | 22.796~21.877 | | | | |
| r15 | ∞ | | | | | | |
| | | d16 | 3.00 | N8 | 1.51680 | ν8 | 64.20 |
| r16 | ∞ | | | | | | |

Σd = 61.496~61.219

In the above table, the radii of curvature from the enlarging side of the screen (left side) are sequentially designated r1, r2, . . . r16, the spacings on the axis are sequentially designated d1, d2 . . . d16, the refractive indices on the glass d-line are sequentially designated N1, N2, . . . N8, and the Abbe numbers are sequentially designated ν1, ν2, . . . ν8. The aforesaid are examples of numerical values of an embodiment including the film holder.

The previously described lens system comprises a negative first lens group and a positive second lens group, and has a transverse magnification $\beta$ such that $\beta = -1/18$ (approximate). This lens system may be used in conjunction with an image scanner, or microfilm projector. In regards to the change [a] in object distance described below, this lens system maintains a constant transverse magnification via the movement amount x and y for the first lens group and the second lens group, respectively.

| Anterior focus | | Posterior focus |
| --- | --- | --- |
| f1 = −38.469 | | x = 0.277 |
| f2 = 21.394 | a = 30 | y = 0.9185 |
| $\beta$1A = 0.04352 | | $\beta$2A = 0.04504 |
| $\beta$1B = −1.2766 | | $\beta$2B = −0.05556 |
| $\beta$ = −0.05556 | | $\beta$ = −0.05556 |

In conventional tandem-type autofocussing methods, an afocal state (no magnification power, parallel luminous flux) is produced between the first lens group 1 and the second lens group 2. Therefore, when, for example, the distance from the object to the first lens group 1 is a distance [a] only, a focussed state cannot be maintained unless the first lens group 1 is always moved a distance [a].

On the other hand, the present invention provides that a focussed state can be maintained by moving the first lens group and the second lens group a distance less than distance [a] because an afocal state is not produced between said first lens group 1 and said second lens group 2. Furthermore, the present invention allows that the diameter of either one or the other of the first lens group 1 or the second lens group 2 may be smaller because an afocal state is not produced (no parallel luminous flux) between said first lens group 1 and said second lens group 2.

In accordance with the foregoing description, the nonvariable transverse magnification focussing method of the present invention decreases the moving distance of the first lens group and second lens group and provides a nonvariable transverse magnification optical system by providing a suitable paraxial arrangement of said lens system and moving the first lens group and second lens group while maintaining a relation therebetween in accordance with specific principles.

Furthermore, when the aforesaid nonvariable transverse magnification focussing method is applied to the optical system of a copying apparatus, said method is capable of simultaneously correcting the focussing for distortion produced by the curvature (change of object position) of an original document such as a thick book or the like placed on the document platen of a copying apparatus.

Figures 4A, 4B:
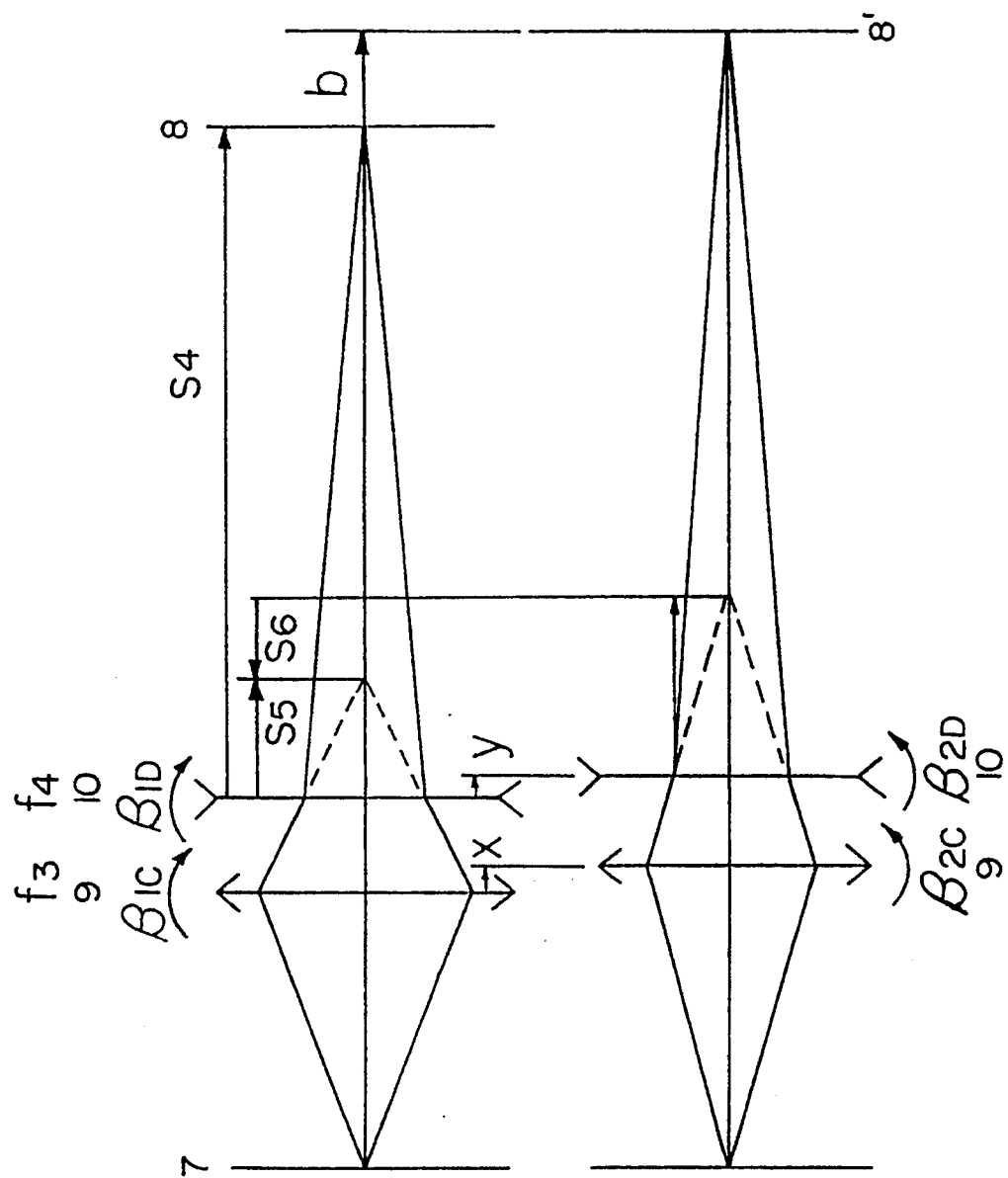
FIGS. 4A and 4B are paraxial optical path diagrams of an alternative embodiment of the invention.

The preferred other embodiment of the present invention is described hereinafter with reference to the accompanying drawings. FIGS. 4A and 4B are paraxial optical path diagrams. The image forming lens system is divided into two groups, a first lens group 9 having a focal length $f_3$ and a second lens group 10 having a focal length $f_4$. The first and seconds lens groups 9 and 10, while maintaining a specific relation therebetween, are independently movable in the direction of an optical axis so as to maintain a constant transverse magnification relative to a position change [b] of the position of an object point 8 to an image point 8' (the coordinate system is such that the left side is always positive).

When the amount of movement of the image point 8 is designated [b] (upon the movement to an object side of image point 8: b>0, upon the movement to an image side of image point 8: b<0), the focal length of the first lens group 9 is designated $f_3$, the focal length of the second lens group 10 is designated $f_4$, the transverse magnification around the first lens group 9 is designated $\beta$1C in the state (b=0) described in FIG. 4A, the transverse magnification around the second lens group 10 is designated $\beta$1D in the state (b=0) described in FIG. 4A, the transverse magnification around the first lens group 9 is designated $\beta$2C in the state (b=b) described in FIG. 4B, the transverse magnification around the second lens group 10 is designated $\beta$2D in the state (b=b) described in FIG. 4B, the amount of movement of the first lens group 9 when changing from the FIG. 4A state to the FIG. 4B state (right side is positive) is designated [x], the amount of movement of the second lens group 10 when changing from the FIG. 4A state to the FIG. 4B state (right side is positive) is designated [y], the distance from the first lens group 9 to the image point 8 in the state described in FIG. 4A (with the first lens group as the origin point, the right side is positive) is designated $S_4$, the distance from the first lens group 9 to the object point in the state described in FIG. 4A (with the first lens group as the origin point, the right side is positive) is designated $S_5$, the amount of movement of the object point of the first lens group 9 when changing from the FIG. 4A state to the FIG. 4B state (when the FIG. 4A state is the origin, the right side is positive) is designated $S_6$, the transverse magnification in the states described in FIGS. 4A and 4B is nonvariable, such that the following equations may be obtained.

$$\beta1C \cdot \beta1D = \beta2C \cdot \beta2D \tag{14}$$

From the paraxial relation around the first lens group 5, the following equations 15 through 18 may be derived.

From the state described in FIG. 4A we obtain the following equations.

$$S_4 = f_4(1 - \beta1D) \tag{15}$$

$$S_5 = -f_4\left(1 - \frac{1}{\beta1D}\right) \tag{16}$$

From the state described in FIG. 4B we obtain the following equations.

$$S_4 + b - y = f_4(1 - \beta2D) \tag{17}$$

$$S_5 + S_6 - y = -f_4\left(1 - \frac{1}{\beta2D}\right) \tag{18}$$

From the paraxial relation around the first lens group 9, the following equations 19 and 20 may be derived.

$$S_6 - y = f_3\left(1 - \frac{1}{\beta1C} - \beta2C + \beta1C\right) \tag{19}$$

$$x = f_3\left(\frac{1}{\beta2C} - \frac{1}{\beta1C}\right) \tag{20}$$

From the aforesaid Eqs. 15, 16, 17 and 18 we can eliminate the factors $S_4$ and $S_5$, and by solving for the factors of [y] and $S_6$ we can derive Eqs. 21 and 22.

$$y = f_4(\beta 2D - \beta 1D) + b \quad (21)$$

$$S_6 = f_4\left(\beta 2D - \beta 1D - \frac{1}{\beta 1D} + \frac{1}{\beta 2D}\right) + b \quad (22)$$

From the aforesaid Eqs. 19, 21 and 22, we can eliminate the factor $S_6$ and [y], and can derive the following Eq. 23.

$$f_4\left(\frac{1}{\beta 2D} - \frac{1}{\beta 1D}\right) = f_3\left(1 - \frac{1}{\beta 1C} - \beta 2C + \beta 1C\right) \quad (23)$$

When we eliminate the factor $\beta 2D$ from the aforesaid Eqs. 14 and 23, we can adjust the factor $\beta 2C$ and thereby derive Eq. 24.

$$\beta 2C = \frac{f_3\left(1 - \frac{1}{\beta 1C} + \beta 1C\right) + \frac{f_4}{\beta 1D}}{f_3 + \frac{f_4}{\beta 1C \beta 1D}} \quad (24)$$

$$\beta 2D = \frac{\beta 1C \beta 1D}{\beta 2D}$$

Although, in the aforesaid example the first lens group 9 is a positive lens group, and the second lens group 10 is a negative lens group, it should be clear to those skilled in the art that, alternatively, said first lens group 9 may be a negative lens group and said second lens group 10 may be a positive lens group.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An nonvariable transverse magnification focussing lens system comprising:

a first lens group and a second lens group each having limited focal lengths, wherein the first lens group and the second lens group are movable independently while maintaining the following equations in accordance with the movement of the object point:

$$x = a - f_1\left(\frac{1}{\beta 2A} - \frac{1}{\beta 1A}\right)$$

$$y = f_2(\beta 2B - \beta 1B)$$

wherein $$\beta 2A = \frac{-B \pm \sqrt{B^2 - 4AC}}{2A}$$

$$\beta 2B = \frac{\beta 1A \beta 1B}{\beta 2A}$$

-continued $$A = f_1 + \frac{f_2}{\beta 1A \beta 1B}$$

$$B = -\left\{f_1\left(\beta 1A + \frac{1}{\beta 1A}\right) + f_2\left(\beta 1B + \frac{1}{\beta 1B}\right) + a\right\}$$

$$C = f_1 + f_2 \beta 1A \beta 1B$$

[a] is the amount of movement of the object point (upon the movement to an image side of object point: a>0, upon the movement to an object side of object point: a<0), $f_1$ is a focal length of the first lens group, $f_2$ is a focal length of the second lens group, $\beta 1A$ is a transverse magnification around the first lens group in the state before movement of object point (a=0), $\beta 1B$ is a transverse magnification around the second lens group in the state before movement of object point (a=0), $\beta 2A$ is a transverse magnification around the first lens group in the state before movement of object point (a=a), $\beta 2B$ is a transverse magnification around the second lens group in the state before movement of object point (a=a),

[x] is the amount of movement of the first lens group when changing from the state before movement of object point to the state after movement of object point (upon the movement to an image side of the first lens group: x>0, upon the movement to an object side of the first lens group: x<0), and

[y] is the amount of movement of the second lens group when changing from the state before movement of object point to the state after movement of object point (upon the movement to an image side of the second lens group: y>0, upon the movement to an object side of the second lens group: y<0).

2. An nonvariable transverse magnification focussing method for a lens system including a first lens group and a second lens group each having limited focal lengths, said method comprising the steps of:

providing the following equations;

$$x = a - f_1\left(\frac{1}{\beta 2A} - \frac{1}{\beta 1A}\right)$$

$$y = f_2(\beta 2B - \beta 1B)$$

wherein $$\beta 2A = \frac{-B \pm \sqrt{B^2 - 4AC}}{2A}$$

$$C = f_1 + f_2 \beta 1A \beta 1B$$

$$\beta 2B = \frac{\beta 1A \beta 1B}{\beta 2A}$$

$$A = f_1 + \frac{f_2}{\beta 1A \beta 1B}$$

$$B = -\left\{f_1\left(\beta 1A + \frac{1}{\beta 1A}\right) + f_2\left(\beta 1B + \frac{1}{\beta 1B}\right) + a\right\}$$

[a] is the amount of movement of the object point (upon the movement to an image side of object point: a>0, upon the movement to an object side of object point: a<0), $f_1$ is a focal length of the first lens group, $f_2$ is a focal length of the second lens group, $\beta 1A$ is a transverse magnification around the first lens group in the state before movement of object point (a=0), $\beta 1B$ is a transverse magnification around the second lens group in the state before movement of object point (a=0), $\beta 2A$ is a transverse magnification around the first lens group in the state before movement of object point (a=a), $\beta 2B$ is a transverse magnification around the second lens group in the state before movement of object point (a=a),

[x] is the amount of movement of the first lens group when changing from the state before movement of object point to the state after movement of object point (upon the movement to an image side of the first lens group: x>0, upon the movement to an object side of the first lens group: x<0), and

[y] is the amount of movement of the second lens group when changing from the state before movement of object point to the state after movement of object point (upon the movement to an image side of the second lens group: y>0, upon the movement to an object side of the second lens group: y<0), and moving the first lens group and the second lens group independently while maintaining the equations in accordance with the movement of the object point.

3. An nonvariable transverse magnification focussing lens system comprising:

a first lens group and a second lens group each having limited focal lengths, wherein the first lens group and the second lens group are movable independently while maintaining the following equations in accordance with the movement of the image point:

$$x = f_3 \left( \frac{1}{\beta 2C} - \frac{1}{\beta 1C} \right)$$

$$y = f_4 (\beta 2D - \beta 1D) + b$$

wherein $$\beta 2C = \frac{f_3 \left( 1 - \frac{1}{\beta 1C} + \beta 1C \right) + \frac{f_4}{\beta 1D}}{f_3 + \frac{f_4}{\beta 1C \beta 1D}}$$

$$\beta 2D = \frac{\beta 1C \beta 1D}{\beta 2C}$$

$$x = f_3 \left( \frac{1}{\beta 2C} - \frac{1}{\beta 1C} \right)$$

$$y = f_4 (\beta 2D - \beta 1D) + b$$

wherein

-continued $$\beta 2C = \frac{f_3 \left( 1 - \frac{1}{\beta 1C} + \beta 1C \right) + \frac{f_4}{\beta 1D}}{f_3 + \frac{f_4}{\beta 1C \beta 1D}}$$

$$\beta 2D = \frac{\beta 1C \beta 1D}{\beta 2C}$$

[b] is the amount of movement of the image point (upon the movement to an image side of image point: b>0, upon the movement to an object side of image point :b<0), $f_3$ is a focal length of the first lens group, $f_4$ is a focal length of the second lens group, $\beta 1C$ is a transverse magnification around the first lens group in the state before movement of image point (b=0), $\beta 1D$ is a transverse magnification around the second lens group in the state before movement of image point (b=0), $\beta 2C$ is a transverse magnification around the first lens group in the state before movement of image point (b=b), $\beta 2D$ is a transverse magnification around the second lens group in the state before movement of image point (b=b),

[x] is the amount of movement of the first lens group when changing from the state before movement of image point to the state after movement of image point (upon the movement to an image side of the first lens group: x>0, upon the movement to an object side of the first lens group: x<0), and

[y] is the amount of movement of the second lens group when changing from the state before movement of image point to the state after movement of image point (upon the movement to an image side of the second lens group: y>0, upon the movement to an object side of the second lens group: y<0).

4. An nonvariable transverse magnification focussing method for a lens system including a first lens group and a second lens group each having limited focal lengths, said method comprising the steps of:

providing the following equations:

$$x = f_3 \left( \frac{1}{\beta 2C} - \frac{1}{\beta 1C} \right)$$

$$y = f_4 (\beta 2D - \beta 1D) + b$$

wherein $$\beta 2C = \frac{f_3 \left( 1 - \frac{1}{\beta 1C} + \beta 1C \right) + \frac{f_4}{\beta 1D}}{f_3 + \frac{f_4}{\beta 1C \beta 1D}}$$

$$\beta 2D = \frac{\beta 1C \beta 1D}{\beta 2C}$$

$$x = f_3 \left( \frac{1}{\beta 2C} - \frac{1}{\beta 1C} \right)$$

$$y = f_4 (\beta 2D - \beta 1D) + b$$

wherein $$\beta_{2C} = \frac{f_3\left(1 - \frac{1}{\beta_{1C}} + \beta_{1C}\right) + \frac{f_4}{\beta_{1D}}}{f_3 + \frac{f_4}{\beta_{1C}\beta_{1D}}}$$

$$\beta_{2D} = \frac{\beta_{1C}\beta_{1D}}{\beta_{2C}}$$

[b] is the amount of movement of the image point (upon the movement to an image side of image point: b>0, upon the movement to an object side of image point b<0), $f_3$ is a focal length of the first lens group, $f_4$ is a focal length of the second lens group, $\beta_{1C}$ is a transverse magnification around the first lens group in the state before movement of image point (b=0), $\beta_{1D}$ is a transverse magnification around the second lens group in the state before movement of image point (b=0), $\beta_{2C}$ is a transverse magnification around the first lens group in the state before movement of image point (b=b), $\beta_{2D}$ is a transverse magnification around the second lens group in the state before movement of image point (b=b),

[x] is the amount of movement of the first lens group when changing from the state before movement of image point to the state after movement of image point (upon the movement to an image side of the first lens group: x>0, upon the movement to an object side of the first lens group: x<0), and

[y] is the amount of movement of the second lens group when changing from the state before movement image point to the state after movement of image point (upon the movement to an image side of the second lens group: y>0, upon the movement to an object side of the second lens group: y<0), and moving the first lens group and the second lens group independently while maintaining the equations in accordance with the movement of the image point.

* * * * *